A. McLENNAN.
ROSSING MACHINE.
APPLICATION FILED MAY 3, 1918.

1,280,789.

Patented Oct. 8, 1918.
3 SHEETS—SHEET 1.

WITNESSES

INVENTOR
Alexander McLennan.
BY
Fetherstonhaugh & Co
ATTYS.

A. McLENNAN.
ROSSING MACHINE.
APPLICATION FILED MAY 3, 1918.

1,280,789.

Patented Oct. 8, 1918.
3 SHEETS—SHEET 2.

WITNESSES

INVENTOR
ALEXANDER McLENNAN
BY
Fetherstonhaugh & Co
ATT'YS.

A. McLENNAN.
ROSSING MACHINE.
APPLICATION FILED MAY 3, 1918.
1,280,789.
Patented Oct. 8, 1918.
3 SHEETS—SHEET 3.
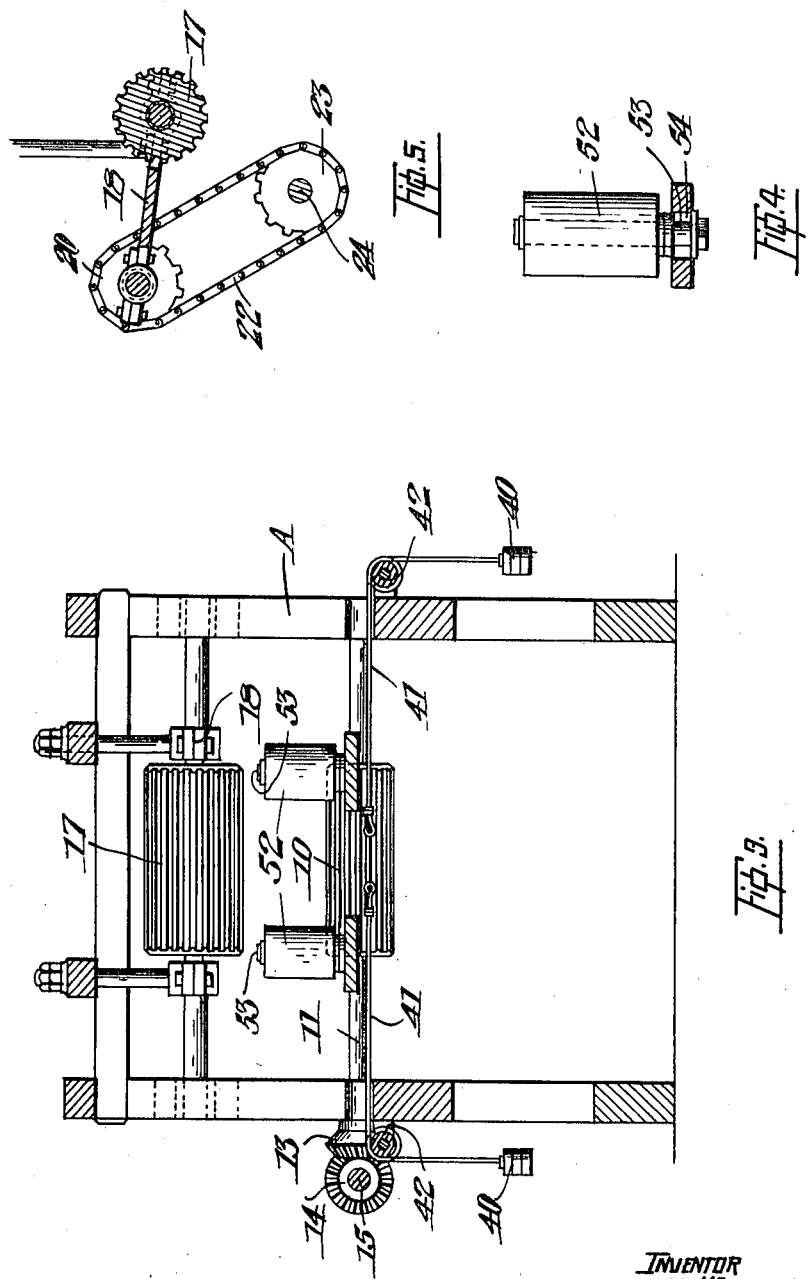
INVENTOR
ALEXANDER McLENNAN

UNITED STATES PATENT OFFICE.

ALEXANDER McLENNAN, OF CAMPBELLTON, NEW BRUNSWICK, CANADA.

ROSSING-MACHINE.

1,280,789. Specification of Letters Patent. Patented Oct. 8, 1918.

Application filed May 3, 1918. Serial No. 232,411.

*To all whom it may concern:*

Be it known that I, ALEXANDER McLENNAN, a subject of the King of Great Britain, and resident of Campbellton, in the Province of New Brunswick, Dominion of Canada, have invented certain new and useful Improvements in Rossing-Machines, of which the following is a specification.

This invention relates to improvements in rossing machines, and the objects of the invention are to provide a simple and effective device which will finish both sides of the round edges of a piece of timber such as a railway cross tie, which will adjust itself automatically to the varying sizes of the straighter stick and accommodate itself to the bend thereof.

Further objects are generally to improve and simplify the construction of the device and to enable the various parts to better perform the functions required of them, and it consists essentially of the improved construction hereinafter described and set forth in detail in the following specification and accompanying drawings forming part of the same.

In the drawings,

Fig. 3 is a sectional view on the lines 2—2 of Fig. 2.

Fig. 4 is a sectional detail on the lines 3—3 of Fig. 2.

Fig. 5 is a sectional detail of the upper feed roller.

In the drawings, like characters of reference refer to corresponding parts in the several figures.

Figure 1:
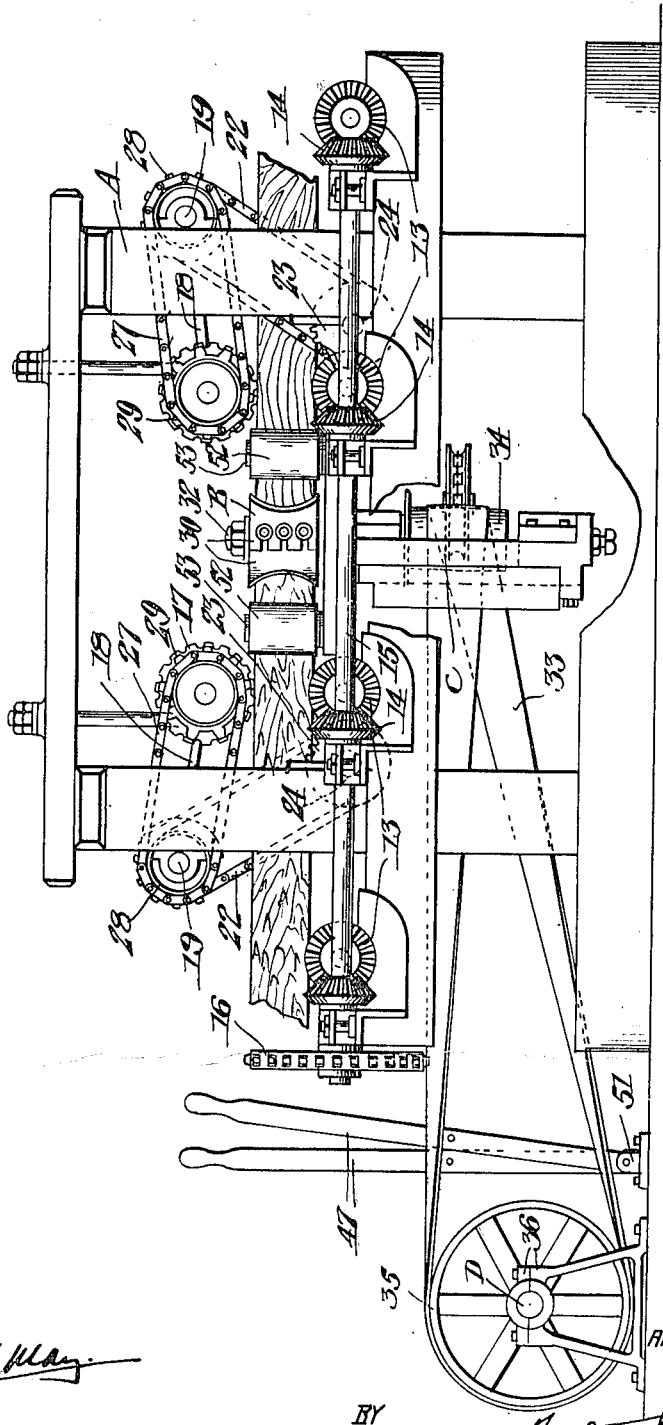
Figure 1 is a side elevation of the invention partly broken away to more clearly show the invention.
Figure 2:
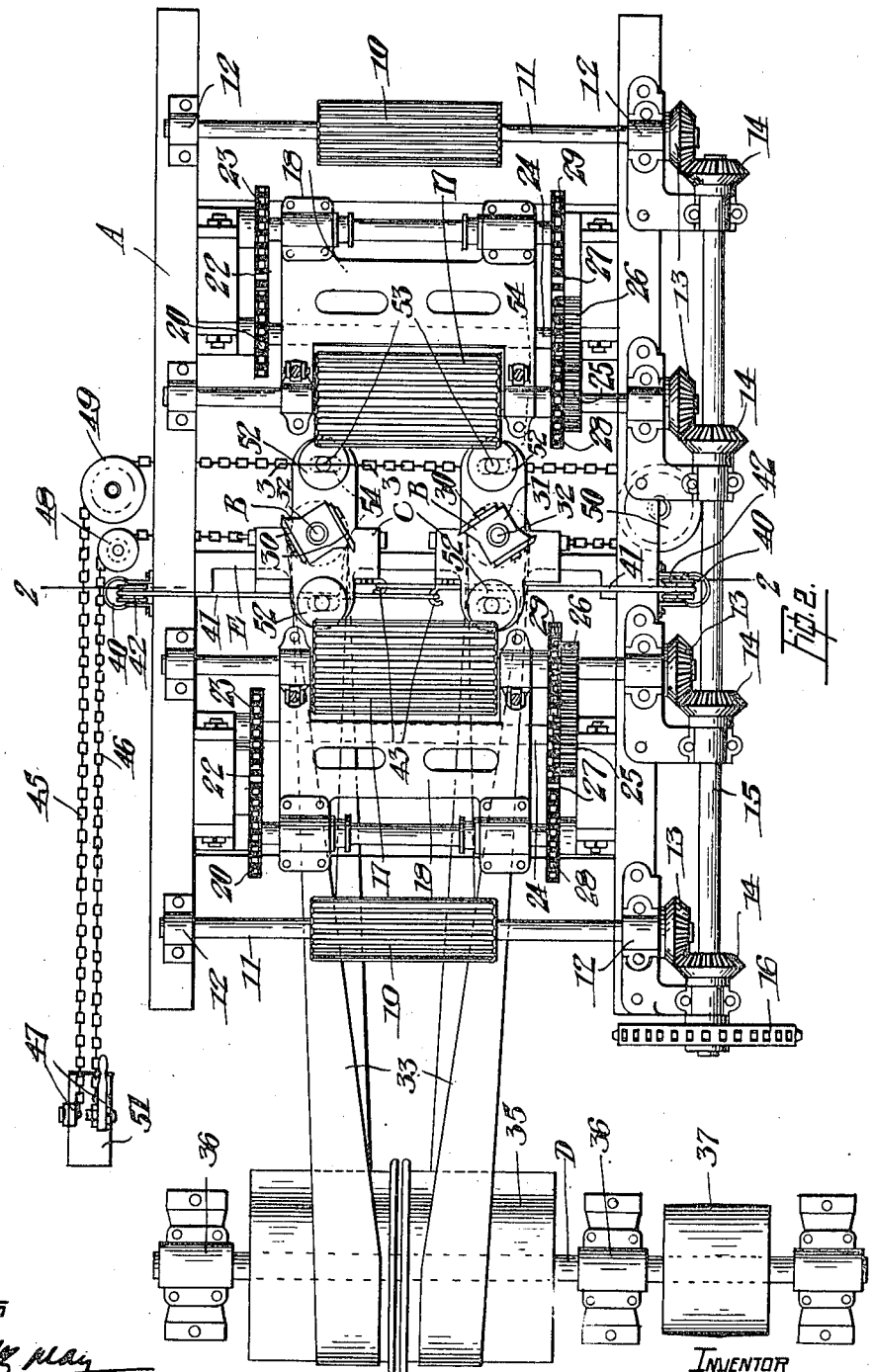
Fig. 2 is a plan view.

Referring to the drawings, A represents a frame of suitable size and shape to operatively support the various working parts.

10 represents the end feed rollers supported on cross shafts 11 journaled in suitable bearings 12 on the frame and carrying beveled pinions 13 driven from beveled gears 14 carried on the drive shaft 15 which may be driven by a sprocket wheel 16 or other equivalent means from any convenient source of power.

17 represents the upper feed roll carried in swinging frames 18 loosely mounted on cross shafts 19, which shafts are suitably journaled and supported from the frames.

The cross shafts may be driven by means of sprockets 20 connected by chains 22 to corresponding sprockets 23 on counter shafts 24, which counter shafts are connected by gears 25 and 26 with one of the shafts 11, this gearing effecting a reversal of the direction and drive and reduction speed so that the upper feed rolls 17, which also serve as pressure rolls may be driven in unison with the end feed rolls.

The upper feed rolls 17 are themselves driven from the shaft 19 by means of the chain 27 and sprockets 28 and 29.

B represents the cutters designed to be located one on each side of the stick or rod to be rossed. These cutters are of usual design carrying blades 30 mounted on blocks 31 carried by vertically extending shafts 32 journaled in sliding frames C, the lower end of the shaft 32 being driven by a belt 33 adapted to engage with a pulley 34 on the shaft 32.

The belt 33 is driven by a suitable pulley 35 on a drive shaft D journaled in suitable bearings 36, and is itself driven from a suitable source of power by a belt or other means engaging with the pulley 37.

The frames C are arranged opposite each other and adapted to slide to and from the center on a track or guideway E being held yieldably in innermost position by suitable means. The means I have illustrated for this purpose comprise a pulley and weight arrangement in which the weight 40 connected to a chain or cord 41 which extends over a pulley 42 is connected to a hook 43 on the frame, the tendency of the weight being to move the frame to innermost position.

To open the frames apart at the commencement of the operation in order that the log may be inserted between the cutters, chains 45 and 46 are provided extending from hand levers 47 over pulleys 48, 49 and 50 to the frames, the levers 47 being pivoted to a fixed bracket 51, so when both the levers are raised the frames will be moved to the outermost position and carry the cutters with them.

To assist in steadying the logs passing the cutters, a plurality of rolls 52 are provided on the frame C adjustable in position to correspond with the depth of cut taken, preferably two of these rollers are provided for each cutter, located one on each side and adjustment may be provided for by adjusting the position of the supporting pin 53 of the rollers in the slots 54.

Suitable reversing mechanism, (not shown) may be provided for reversing the drive of the feeding rolls to return across tie or the like, which on account of protruding knots or flat places has not been properly rossed.

In practising the invention the machine operator will first actuate the levers 47 to spread the frames apart, thus overcoming the tension of the weights 40 and permitting the first log to be inserted in position, the feed rollers are then driven and the logs fed successively between the cutters, which being held yieldably in contact therewith, will ross the bark therefrom to a depth determined by the adjustment of the rollers 52.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A rossing machine comprising means for feeding a log longitudinally, a transversely extending guideway, a pair of frames slidably mounted on the guideway, rotary cutters on the frames, means for driving the cutters, means for yieldably forcing the frames toward a central position, and means for spreading the frames apart.

2. A rossing machine comprising means for feeding a log longitudinally, a transversely extending guideway, a pair of frames slidably mounted on the guideway, rotary cutters on the frames, means for driving the cutters, means for yieldably forcing the frames toward a central position, rollers on each side of each cutter mounted on the frame, means for adjusting the position of the rollers.

3. A rossing machine comprising means for feeding a log longitudinally, a transversely extending guideway, a pair of frames slidably mounted on the guideway, rotary cutters on the frames, means for driving the cutters, means for yieldably forcing the frames toward a central position, and means for spreading the frames apart, the said means comprising chains 45 and 46, hand levers connected to the chains and pulleys supporting the chains.

4. A rossing machine, comprising means for feeding a log longitudinally, a pair of cutters, shafts supporting the cutters, sliding frames supporting the shafts, pulleys on the shafts, a transversely extending track supporting the frames, pulleys and weights connected to the sliding frames and adapted to normally bring them to innermost position, upper feed rollers, swinging frames supporting the same, cross shafts supporting the frames, sprockets on the cross shafts, sprockets on the counter shafts, chains connecting the two sprockets, and reversible gearing operatively connected to the counter shaft.

In witness whereof I have hereunto set my hand in the presence of two witnesses.

ALEXANDER McLENNAN.

Witnesses:
H. MILLER,
H. M. McLENNAN.